Jan. 6, 1970 J. L. SULLIVAN ET AL 3,488,620

BUS STRIP

Filed Nov. 13, 1967

INVENTORS
JAMES L. SULLIVAN
FRANK A. WILKIE
BY Jack C. Munro
AGENT

United States Patent Office 3,488,620

Patented Jan. 6, 1970

3,488,620

BUS STRIP

James L. Sullivan, 1504 Highland Ave., Manhattan Beach, Calif. 90266, and Frank A. Wilkie, 9316 Kessler Ave., Chatsworth, Calif. 91311

Filed Nov. 13, 1967, Ser. No. 682,274
Int. Cl. H01r *31/08*
U.S. Cl. 339—19 3 Claims

ABSTRACT OF THE DISCLOSURE

An easily removable, solderless, electrical connector for adjacent independent electrical contacts having a pair of spring biased arms which abut the contacts on opposite sides thereof thereby providing two separate conductors for the passage of electrical current.

BACKGROUND OF THE INVENTION

In the field of electrical circuitry it has been found to be of great advantage to mount the transistors, inductors, resistors, capacitors, etc. on a terminal board which is then installed within the entire electrical apparatus. Common types of such apparatus are computers, space circuitry, telephone connections, household appliances, etc. One purpose of such a board is to facilitate ease of installation of the electrical elements. Also, the board may be easily removed from the entire apparatus and defective elements easily replaced. Such boards are usually composed of a base of metallic material (non-metallic if desired) with a series of female type of electrical connections mounted on one side of the board. Each of the female electrical connections terminate on the opposite side of the board in a terminal post. If the board is metallic thereby electrically conducting, each of the posts are electrically insulated against the board. The female connections of the board are to cooperate with corresponding male connections of the particular electrical apparatus.

In the employment of such a board having a great many of the terminal posts thereon, it frequently is desirable to connect adjacent posts for the passage of electrical current. One means which has been commonly used has been to merely employ an electrically conducting wire and solder the wire to each of the series of posts. As it is common for there to be a series of rows of terminals (for instance 10 to 12 rows of 15 to 20 terminal posts each) and the rows of the terminal posts are spaced relatively close together, it is quite difficult to use a soldering gun in such spaced quarters and obtain an adequate electrical connection. To overcome the disadvantages of the solder type of connection, a solderless connection has been developed which is usually referred to as a "wire wrap." Each of the terminal posts are either square or rectangular in configuration resulting in each post having four sharp corners. Wire wrapping is accomplished by taking a small gauged wire and winding the wire around a specific terminal post a plurality of times (usually six or seven times). Next, the same piece of wire is wound around each of the posts desired to form the common electrical connection, the wire itself making this connection. As each of the posts has four sharp corners and the wire is wound tightly about each post, the wire is imbedded in the sharp edges of each of the posts thereby achieving a sound electrical connection. However, one of the main disadvantages of the wire wrap technique is the man hours necessary to accomplish the installation. Further, as the size of the wire employed is limited, usually 28 to 30 gauge wire, current carrying capacity is also limited. Further, a common disadvantage of both the soldering method and the wire wrap method is that both types of connections are not easily removable. In other words, if it is desirable to alter the connections for any reason, it is usually difficult to do so, as the wire must be unsoldered and/or unwarpped and then the wire being discarded and replaced.

One method of connection which has attempted to overcome the above disadvantages has been to employ a breakaway band. Briefly, this band is formed of conducting material which is formed into a longitudinal strip. The strip has apertures therein which cooperate with the terminal posts of the terminal board, the apertures effecting the holding of the strip in tight engagement with the terminal posts. When it is desired that a certain length band is needed, by simply manually flexing the band once or twice, a breaking is effected. This length band is placed over a series of the terminal posts in a single row. In this manner, a common electrical ground is created between those posts so connected.

However, in the effort to permit this ease of installation and use of a conducting strip, reliability and amount of conducting power was sacrificed. First, the flexing of the band to cause the separation at one point can cause a minute crack which is unobservable to the human eye in another portion of the band. Such a crack can cause a substantial decrease in the amount of power transmission. Second, to permit ease of breaking, a relatively small amount of electrical conducting surface area had to be employed. This limited the power transmission of the entire conducting strip. While this strip overcomes the disadvantages of the difficulty of installation of the soldering type of connection and also the ease of installation which is not inherent in the wire wrapping technique, certain other disadvantages are created. It is because of the disadvantages created by the breakaway strip, the conducting strip (bus strip) of applicant's invention has been designed.

SUMMARY OF THE INVENTION

The bus strip of this invention comprises a pair of electrically conducting elements connected through an apex portion. The elements are to contact on opposite sides thereof a plurality of terminal posts which are mounted in a row on a single planer surface. The apex portion contains a plurality of apertures, each aperture being of just sufficient size to permit passage of a single terminal post. The apex portion is resilient which tends to force the elements together when in the position about the row of terminal posts thereby maintaining a positive contaction at all times with each terminal post of the row of posts.

It would appear from the foregoing description that the basic objectives of applicants' bus strip have been clearly enumerated. However, it is to be noted that the bus strip of applicants' invention incorporates the advantages of a solderless connection, ease of installation and removal, plus the employment of substantially greater electrically conducting cross-sectional area. Although applicants' bus strip permits the transmission of a greater amount of electrical power, the actual physical size of the strip is equal to or less than the space occupied by the wire wrap technique, the wire soldering method, or the breakaway strip.

These, together with other objects and advantages will become subsequently apparent as the details of construction and operation as more fully hereinafter described and claimed, reference being had to the accompanying drawing a part hereof.

DESCRIPTION OF THE SHOWN EMBODIMENT

Figures 1, 2:
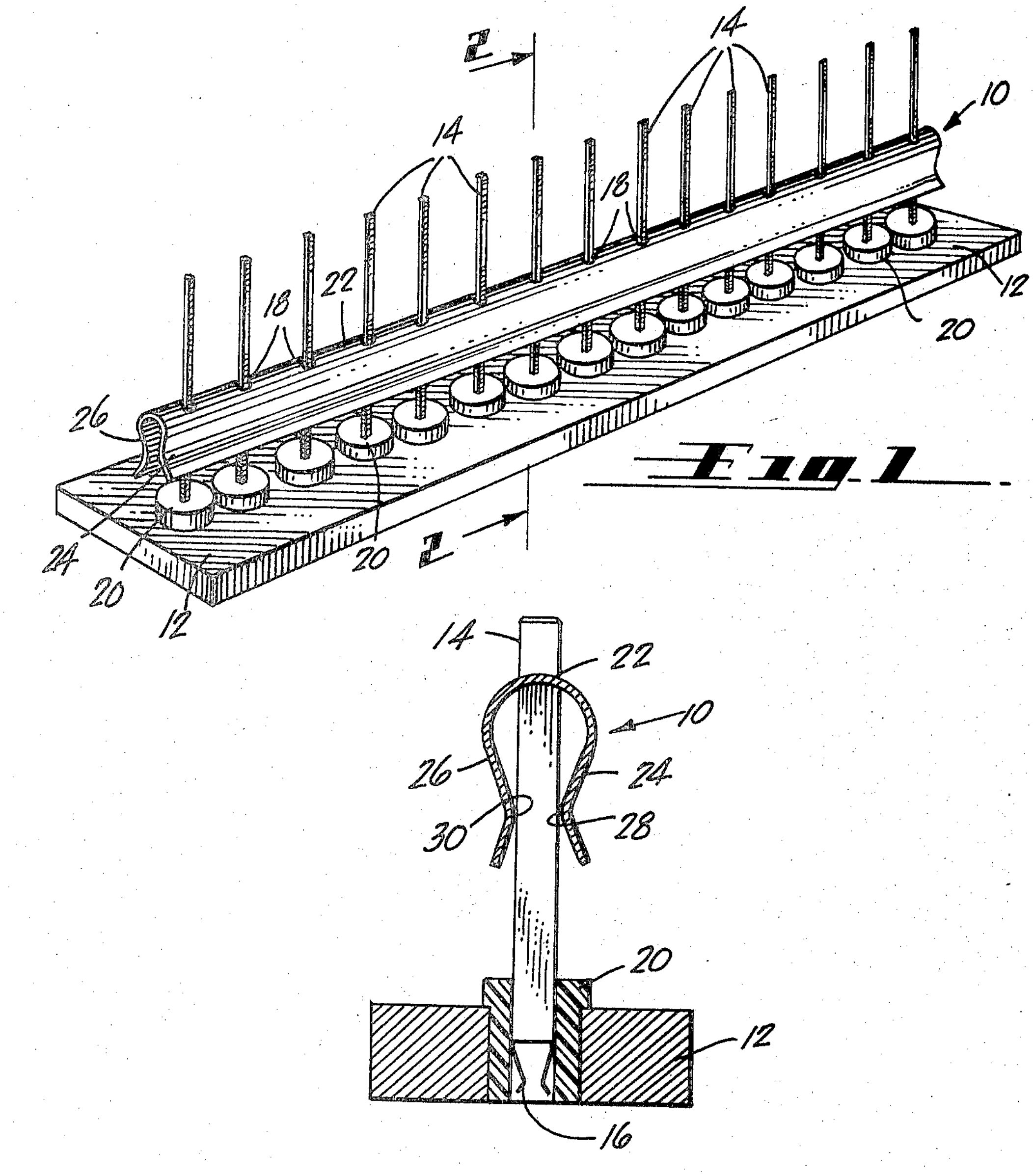
FIGURE 1 is a pictorial view of applicants' conducting bus strip as employed in conjunction with a plurality of terminal posts of a terminal board.
FIGURE 2 is an end cutaway view of the bus strip of this invention taken along line 2—2 of FIGURE 1.

Referring particularly to FIGURE 1, there is shown the bus strip 10 of applicants' invention employed in conjunction with a terminal board 12. Projecting perpendicularly from the surface of the terminal board 12 are a plurality of terminal posts 14. As shown in the drawing the posts 14 are aligned in a single row only one row being shown. However, it is to be understood that each terminal board 12 would have a plurality of rows of posts 14. Each of the terminal posts 14 are depicted as being square in configuration. However, it is to be understood that the particular manner of design of the terminal posts does not specifically form a part of this invention. It has only been found that a post which has been formed to include sharp corners gives greater reliability as to electrical connections established therewith. Any polygonal shape of post would serve as being satisfactory.

Located on the underside of the terminal board 12 are a series of electrical female connectors 16. It should be readily apparent from the drawing that there is one connector 16 per terminal post with each of the connectors 16 being integrally attached to its particular terminal post 14. The use of the female connector 16 permits attachment of the terminal board to corresponding male circuitry in which the terminal board is to be employed. It is to be understood that to use female connectors on the opposite side of the terminal board forms no direct part of this invention. It is contemplated that any type of terminals could be employed as for example male terminal posts.

The bus strip 10 of applicants' invention is shown having a series of spaced apertures 18. The spacing of the apertures 18 is identical to the spacing of the terminal posts 14 so that the bus strip 10 may be positioned around the terminal posts 14 with each post 14 cooperating with an aperture 18. Each of the posts 14 are supported within the terminal board 12 by means of an insulator 20. The portion of the bus strip 10 which has the apertures 18 located therein is termed the apex portion 22 which connects the leg members 24 and 26. Legs 24 and 26 are integrally connected to the apex portion 22 in that their terminal ends are flared slightly to present electrical contact points 28 and 30 respectively. Contact points 28 and 30 are to contact the terminal posts on opposite sides thereof.

The entire bus strip 10 is formed of a metallic material to permit the conductance of electricity, the material also being inherently resilient. The resiliency of the strip 10 acts similar to the action of a spring to force the legs 24 and 26 into constant contact with the terminal post so that a positive electrical connection is maintained at all times. The two contact points 28 and 30 take electricity from the terminal posts. It is also felt to be readily apparent that almost the entire surface area of the bus strip except for the area removed by the apertures 18 performs to conduct electricity from terminal post to terminal post. It has been found that because of this area of conductance, the bus strip would occupy the same space as would be employed in the wire wrap method employing 28 to 30 gauge wire which could only transmit about one-half as much electrical power as applicants' device (equivalent to 16 to 18 gauge wire).

Further, to install the bus strip of applicants' invention it is only necessary to cut off the required length to connect a series of terminal posts, mate each aperture 18 with a terminal post 14 and slide the bus strip upon the posts. Thereby, a common path has been established between those posts with which the bus strip coacts. The remaining extending portion of the terminal post can then be employed to interconnect electrically with one another.

What is claimed is:

1. In combination with an electrical terminal board, said terminal board having a plurality of spaced terminal posts extending therefrom, said posts being arranged in a row, each of said posts being electrically insulated with respect to each other, an electrical conducting strip comprising:

an elongated unitary structure having an apex portion and a pair of leg portions depending therefrom in a spaced relation, said apex portion being substantially semi-circular in cross section and having a plurality of spaced apertures therein, the portions of said unitary structure located on each side of said apertures being substantially mirror images of each other, each of said apertures being capable of cooperating simultaneously with said plurality of terminal posts, said leg portions being capable of contacting each of said terminal posts in said row on opposite sides thereof, each of said leg portions being flared at their extremities outwardly away from each other so that the contaction by said leg portions with said terminal posts being substantially lineal, each line contact of said leg portions being in a parallel relationship with each other and the plane passing through the aforesaid line contacts being substantially perpendicular to the longitudinal axes of said posts, said apex portion being structurally resilient to function as a spring under compression to tend to maintain said leg portions in contact with said terminal posts.

2. An apparatus as defined in claim 1 wherein:

said terminal posts are polygonal in shape whereby a larger area of contaction is achieved between said leg portions and said terminal posts.

3. An apparatus as defined in claim 2 wherein:

said polygonal shape is square.

References Cited

UNITED STATES PATENTS

| | | | |
|---|---|---|---|
| 2,858,372 | 10/1958 | Kaufman | 339—19 |
| 3,085,177 | 4/1963 | Thompson. | |
| 3,179,855 | 4/1965 | Brombaugh. | |
| 3,410,952 | 11/1968 | Knaub et al. | 174—88 |

PETER M. CAUN, Primary Examiner

U.S. Cl. X.R.

174—88; 339—150